United States Patent
Falah et al.

(10) Patent No.: US 10,810,325 B2
(45) Date of Patent: Oct. 20, 2020

(54) METHOD FOR CUSTODY AND PROVENANCE OF DIGITAL DOCUMENTATION

(71) Applicant: JPMorgan Chase Bank, N.A., New York, NY (US)

(72) Inventors: Samer Falah, Staten Island, NY (US); Patrick Mylund Nielsen, Brooklyn, NY (US); Joe Vieira, Wilmington, DE (US); Rajat Jain, Columbus, OH (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 47 days.

(21) Appl. No.: 16/105,286

(22) Filed: Aug. 20, 2018

(65) Prior Publication Data

US 2019/0272392 A1    Sep. 5, 2019

Related U.S. Application Data

(60) Provisional application No. 62/547,153, filed on Aug. 18, 2017.

(51) Int. Cl.
*G06F 21/64* (2013.01)
*H04L 9/08* (2006.01)
*H04L 9/32* (2006.01)

(52) U.S. Cl.
CPC .......... *G06F 21/645* (2013.01); *H04L 9/0894* (2013.01); *H04L 9/3239* (2013.01); *H04L 2209/38* (2013.01)

(58) Field of Classification Search
None
See application file for complete search history.

(56) References Cited

U.S. PATENT DOCUMENTS

| | | | |
|---|---|---|---|
| 6,366,682 B1 * | 4/2002 | Hoffman | G06Q 20/26 382/115 |
| 8,576,283 B1 * | 11/2013 | Foster | H04N 7/188 348/143 |
| 10,614,535 B2 * | 4/2020 | Forte | G06Q 50/18 |
| 2007/0192251 A1 * | 8/2007 | Lowrance | G06F 21/64 705/50 |
| 2009/0141318 A1 * | 6/2009 | Hughes | H04N 1/00538 358/498 |
| 2011/0087690 A1 * | 4/2011 | Cairns | G06F 16/137 707/769 |
| 2011/0119495 A1 * | 5/2011 | Daoud | G06F 21/79 713/183 |
| 2014/0013111 A1 * | 1/2014 | Herbach | H04L 9/0866 713/158 |
| 2015/0006474 A1 * | 1/2015 | Halder | G06F 16/93 707/608 |
| 2015/0066858 A1 * | 3/2015 | Sabdar | G06F 16/128 707/639 |

(Continued)

*Primary Examiner* — Benjamin E Lanier
(74) *Attorney, Agent, or Firm* — Greenblum & Bernstein, P.L.C.

(57) ABSTRACT

Methods of ensuring that the ownership, location, and provenance of a digital asset. The method utilizing a hash value and block chain technology to validate the ownership and provenance. The hash value derived from the digital asset itself. The methods comprising a registry and predetermined formula for generating a hash value from the digital asset, ownership information, storage location, and a description of the asset.

18 Claims, 10 Drawing Sheets

(56) References Cited

U.S. PATENT DOCUMENTS

2017/0357822 A1* 12/2017 Wei ...................... H04L 9/0825
2017/0364699 A1* 12/2017 Goldfarb ............. G06F 21/6227
2019/0052466 A1*  2/2019 Bettger ................. H04L 9/0861

* cited by examiner

METHOD FOR CUSTODY AND PROVENANCE OF DIGITAL DOCUMENTATION

CROSS REFERENCE TO RELATED APPLICATIONS

This application claims priority to U.S. Provisional application 62/547,153 filed on Aug. 18, 2017 and incorporated herein by reference in its entirety.

TECHNICAL FIELD

The present invention relates generally to a method of ensuring that the custody of a digital document is managed and the provenance of the digital document is determinable.

BACKGROUND OF THE INVENTION

Contracts and other documents are commonly negotiated by two or more parties until an agreement is reached. Once the parties come to an agreement, one or more of the parties execute a document representing or otherwise associated with the agreement. In previously known methods of managing these sorts of agreements, a paper copy of the agreement was signed by at least one party to the agreement. This paper copy was then identified as the original copy. This identification may have been in the form of a raised seal or other marking to indicate that the document was the original copy. This original copy was then stored securely by the party who was considered the owner of the document. For example, if the document was an agreement to transfer a particular piece of property, the owner of the property generally would also control the original document. With the advent of electronic copies of these types of agreements as well as the acceptance of digital signatures, it is possible that a paper copy of the document representing the original document does not exist. Instead, a digital instance of the agreement must be designated as the original copy. Unfortunately, digital documents can easily be edited and multiple copies of the document made.

In addition to determining whether a copy represents an original, unchanged version of a document, tracking the location of such a document may also be difficult. As with most types of digital data files, a data file representing a document can easily be repeatedly copied. As such, there could be many identical copies of a document in existence. Therefore, determining where a particular electronic copy of the document that represents the original document is located may be extremely difficult or impossible using known methods. What is needed is a method of tracking the veracity, the ownership, and the storage location of the original copy of a digital document.

SUMMARY

Embodiments of the present invention comprise methods of ensuring the provenance of digital documentation. In an exemplary embodiment of the invention, a document that represents an agreement between two or more parties may be electronically stored at a first storage location. In such an embodiment, an administrator associated with the storage location accepts the document, validates that the document is the original copy of the agreement between the multiple parties, and facilitates the execution of the document by the two or more parties. The administrator then converts the document into a digital format if it is not already in such a format. In certain exemplary embodiments, the agreement may be in a format that is inherently digital-only and, thus, not require conversion. The digital document is stored in the storage location. A hash value may be calculated based on the converted but otherwise unaltered document. A descriptive identifier for uniquely identifying the digital document is generated. The calculated hash value, the descriptive identifier, and the document location may then be entered in a shared registry using a private key to secure the entry (e.g. using a blockchain technique to secure the successive entries into the shared registry). In order to establish the provenance of the document, a hash value is calculated from the shared registry entry. These hash values may be incorporated into the next registry entry so that each successive entry comprises a code that may be used to verify the integrity of the previous entry in a successive chain of entries, and ultimately the document to which the registry entries reference.

In an exemplary embodiment of the invention, the administrator (which might be one of the parties to the agreement or which might be a third party) may request a transfer of ownership of the document to a party who is to be considered the owner of the document. This transfer is authenticated using the private key of the administrator, and the request is stored in the shared registry. The party to whom the document is being transferred may confirm the transfer of the document by recording the acceptance of ownership in the shared registry using the receiving party's private key. These entries may also be secured using a blockchain technique in which each successive entry into the shared registry comprises a hash value generated from the previous entry using a predefined algorithm. As a result, each successive entry may be used to validate that the data from the previous entry has not been altered. This process ensures the provenance of the document.

In an exemplary embodiment of the invention, the owner of the document may grant another party (for example, a requesting party) access to the document by identifying the storage location of the document and providing the party the necessary security credentials to allow viewing of the document. In order to provide a complete record of the provenance of the document, the requesting party may be required to log a request to access the document in the shared registry before being provided the information necessary to view the document.

In an exemplary embodiment of the invention, in order to transfer the location of the document, the owner may record a request to relocate the document in the shared registry. A second administrative party may then receive the asset from the first administrative party and store the document in a new storage location. Once this transfer has occurred, the second administrative party may validate the authenticity of the document and store information comprising the new location, hash, and identity of the owner on the shared registry. This information is secured by the second administrative party's private key. The first administrative party may then delete the document in the original storage location.

In another exemplary embodiment of the invention, the owner of a document may determine that the document should be deleted or destroyed. In such an embodiment, the owner of the document may record an entry into the shared registry indicating such a desire. The administrative party may then delete or destroy the document and enter an entry into the register that confirms that the document has been deleted or destroyed. In certain embodiments of the invention, the owner and administrator may be the same.

BRIEF DESCRIPTION OF THE DRAWINGS

These and other features and advantages of the present invention will become better understood with regard to the following description and accompanying drawings in which.

DETAILED DESCRIPTION

Figure 1:
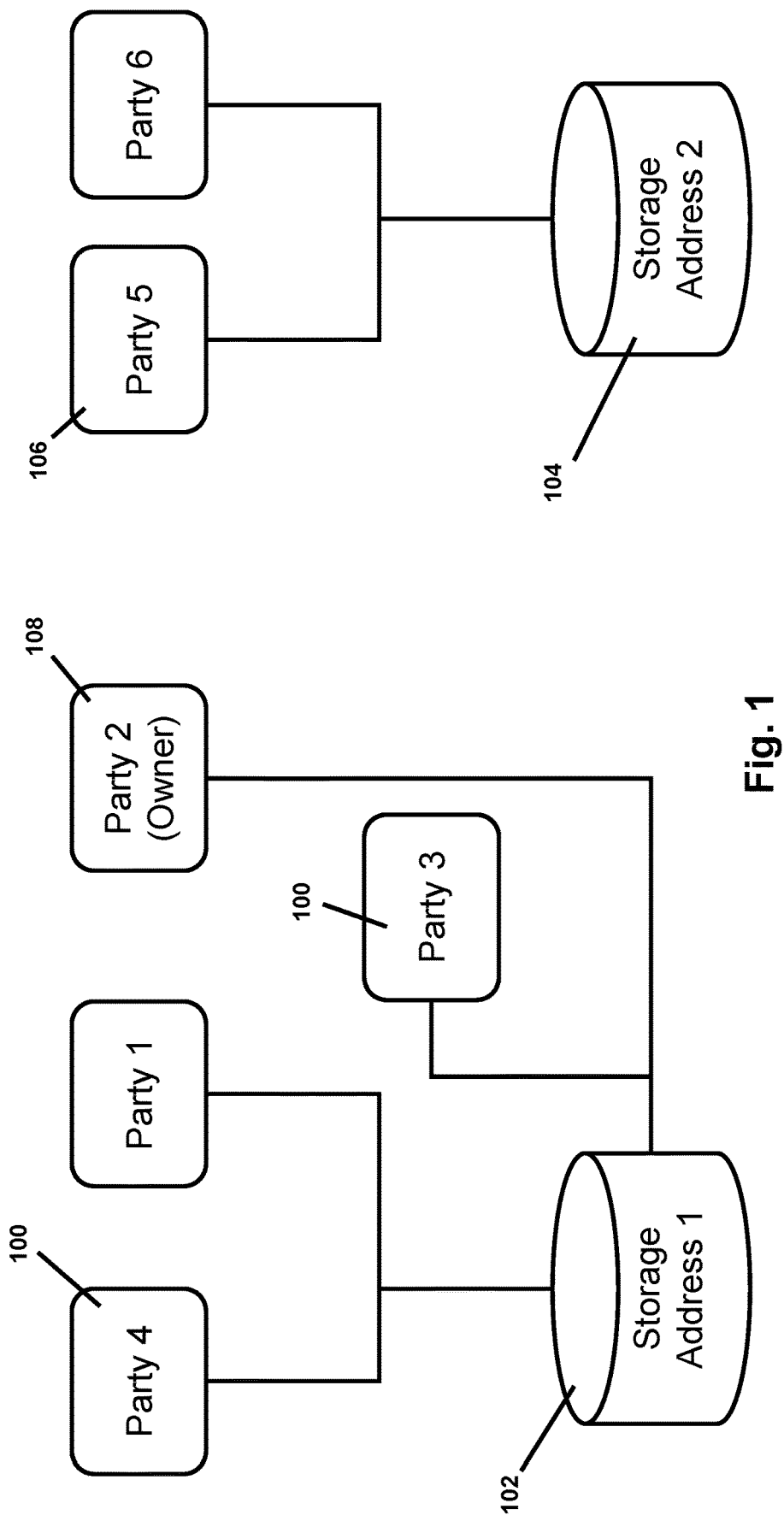
FIG. 1 illustrates a known method of storing a digital document.

FIG. 1 illustrates a known method of storing a digital document. As is illustrated, various parties may have access to a plurality of storage locations. Each storage location may contain a copy of a digital document. In addition, as illustrated at 100, parties 3 and 4 may both have access to a first storage location 102. Without a means for securing a document, either party 3 or party 4 may access and potentially modify the document. Further, as illustrated, a second storage location 104 may comprise a second copy of the document. Without employing the methods of the present invention, another party 106 (i.e. party 5) with access to the second storage location 104 may not realize that the copy contained therein is not the original document or even that another party 108 (i.e. party 2) may be the owner of the document. In addition, without employing an embodiment of the inventive method, parties may not be able to determine whether a copy of the document is unchanged from the original. This description frequently refers to a digital document but it should be understood that the method contemplates various other types of digital assets. For example, and without limitation, the method may be equally applicable to digital audio, digital video, and digital image files. As such, references to digital documents and digital assets should be understood to have the same meaning and refer generally to items for which embodiments of the invention are applicable.

Figure 2:
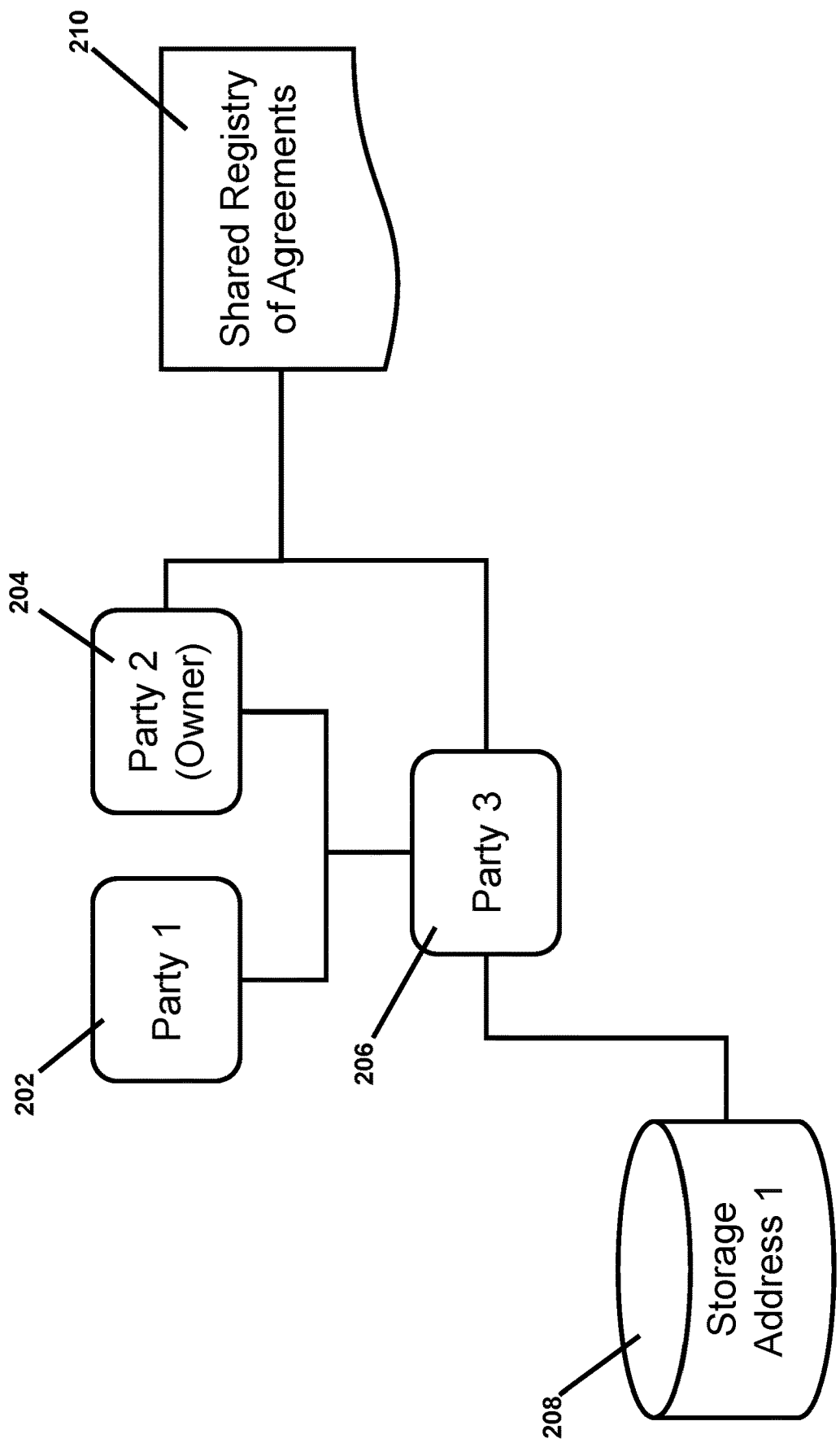
FIG. 2 is a diagram illustrating the parties to an agreement, an administrative party, a storage location, and a shared registry according to an exemplary embodiment of the invention.
Figure 3A:
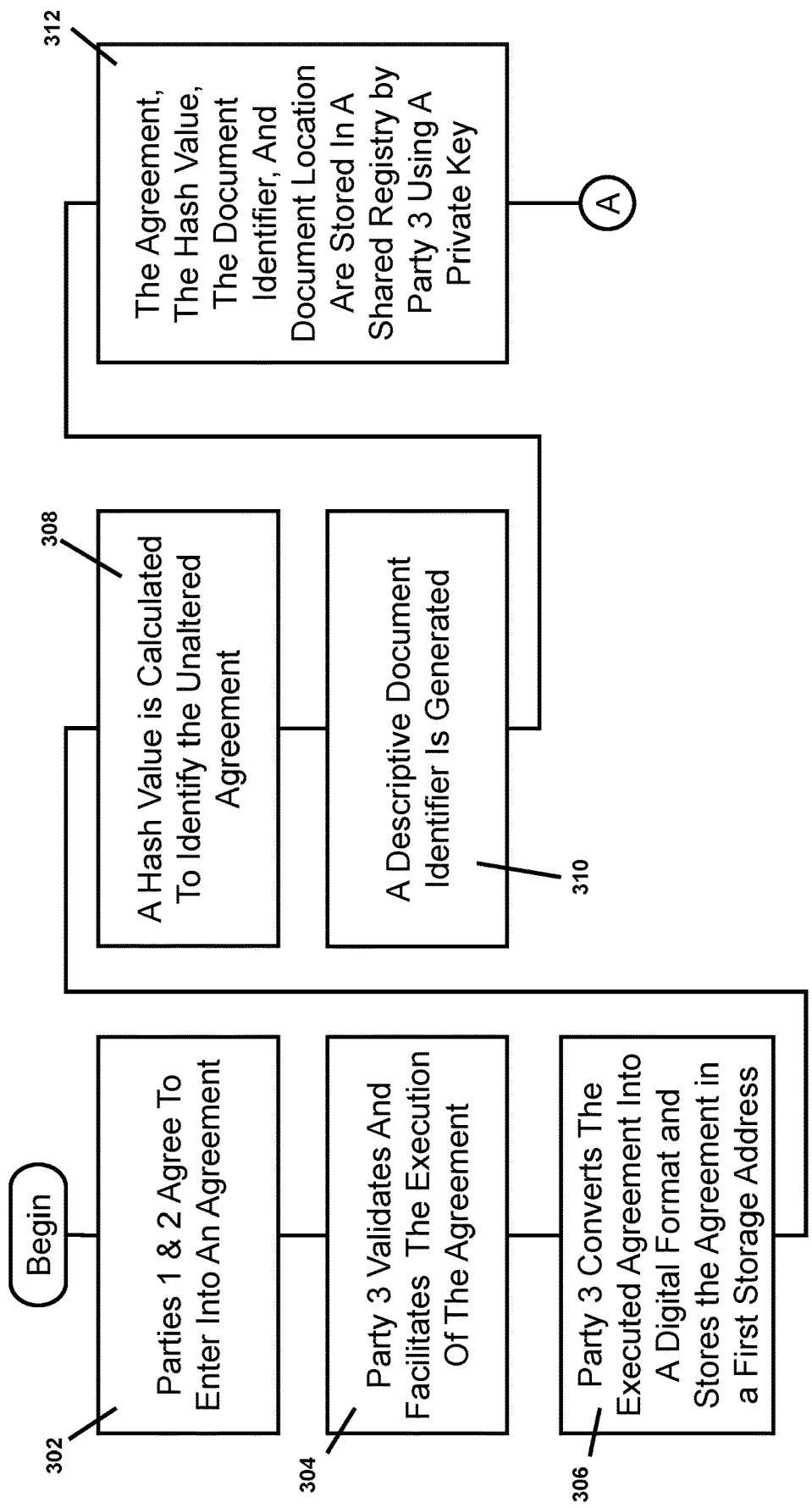
FIGS. 3A and 3B are a flow chart illustrating the steps taken to store and record the provenance of a digital document according to an exemplary embodiment of the invention.
Figure 3B:
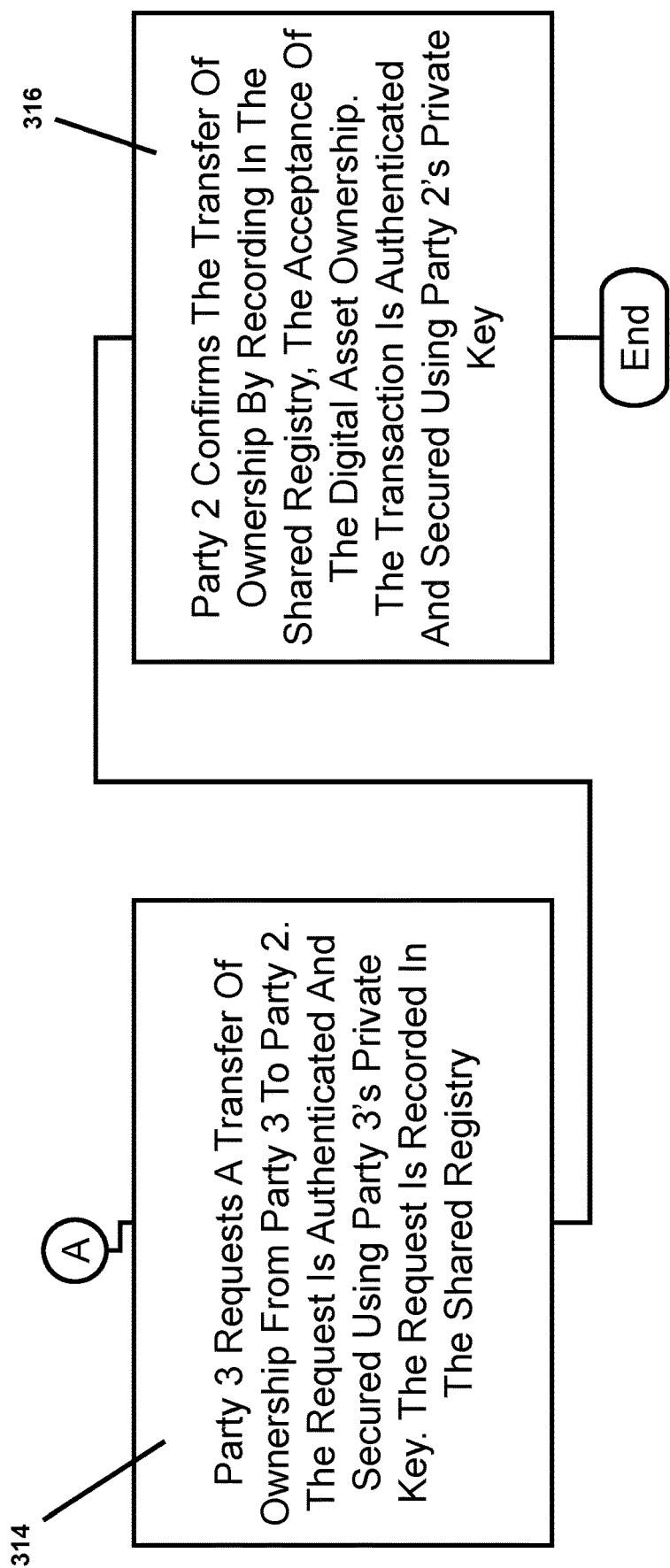

Referring to the diagram of FIG. 2 and the flowchart of FIGS. 3A and 3B, a first party 202 and a second party 204 may enter into an agreement in step 302 which is described by a certain document. As is illustrated in step 304, a third party 206 may validate and facilitate the execution of an agreement. In step 306, the third party 206 may then convert the document representing the terms of the agreement into a digital format and store the document in a first storage address 208. In step 308, a hash value may be calculated in order to identify the unaltered document. This hash value may represent a value that is calculated using a predetermined algorithm, as known in the art, and is based on document data. The hash value is typically numeric in nature but may be alphanumeric or may comprise certain symbols. The length of the hash value is such that is it virtually certain that the value calculated by the algorithm uniquely identifies the document data. Because the algorithm uses the document data to calculate the hash value, any changes to the document result in a different hash value. Therefore, in order to determine if a document is original, one only has to apply the questionable document data to the algorithm and calculate a hash value. This hash value can then be compared to the original hash value. If there is any difference between the two hash values, the document data has likely been altered. Thus, the original hash value provides a method of determining whether a copy of the document is unchanged from the original.

Figure 4:
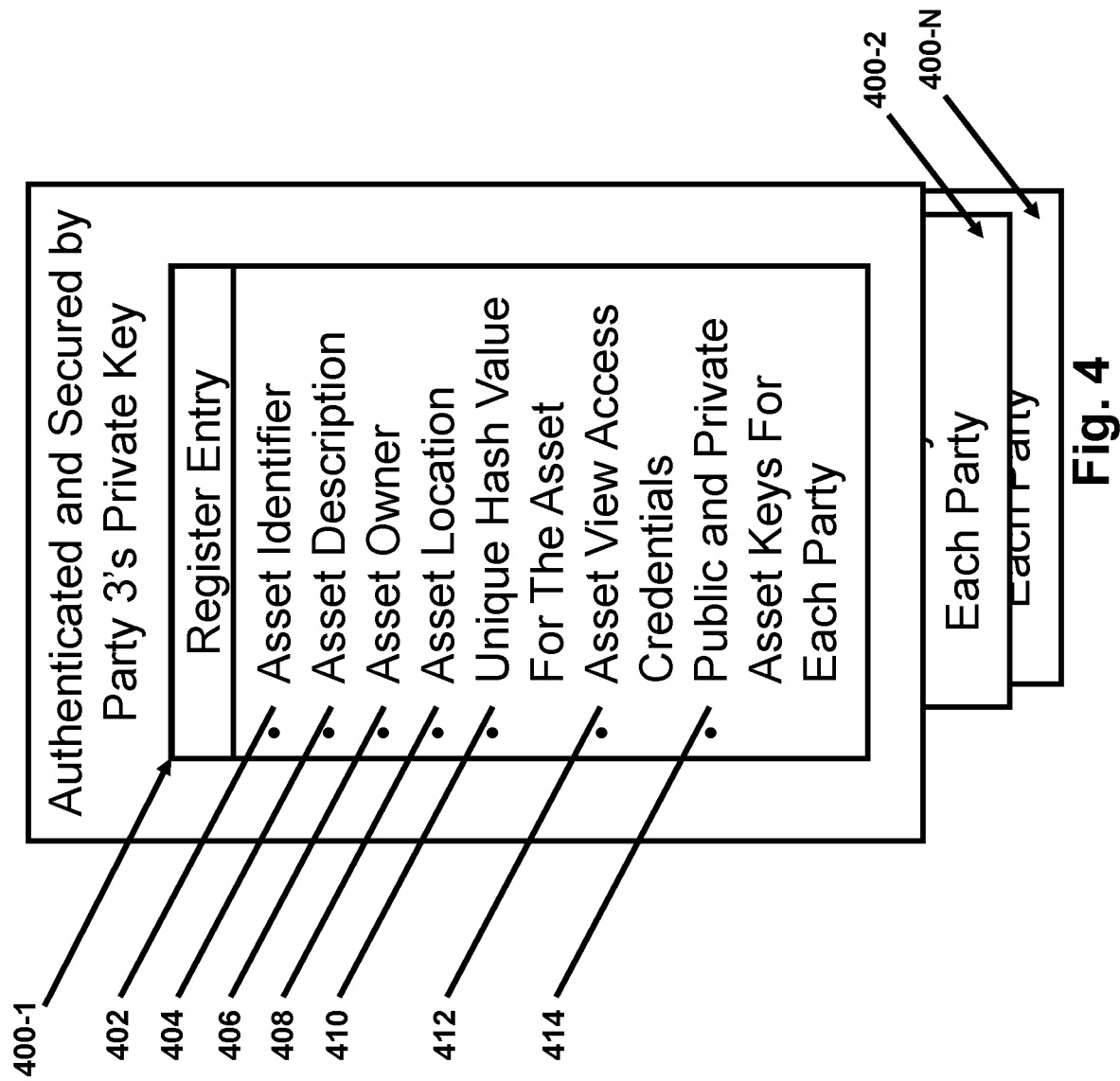
FIG. 4 illustrates a representation of an entry into the shared registry according to an exemplary embodiment of the invention.

In step 310, a descriptive document identifier is generated. This identifier may serve many purposes but is particularly useful in that it allows someone to identify the document content without having to access the document in its storage location. In step 312, this identifier, the calculated hash value, and the location of the document (the first storage location) are stored in a shared registry. An example of such a registry is illustrated in FIG. 2 at 210. As is illustrated in FIG. 4, an example registry entry 400-1 may comprise an asset or document identifier 402, a description of the asset 404, the identity of the asset owner 406, the storage location of the asset 408, a hash identifier 410, and a listing of the credentials required to view the asset 412. A plurality of registry entries may be created in order to track status changes of the asset. These are illustrated as 400-2 and 400-N which represents the Nth register entry which is the most recent. Additional entries may be references by N+1, N+2, etc. The registry entry 400-1 may also comprise public and private key information 414 that may be used to grant various permissions such as, but not limited to, viewing the asset, moving the asset, and changing ownership. For the purposes of this example, it is assumed that the second party 204 is the owner of the document. As such, the third party 206 is simply the administrator of the transaction between the first party 202 and second party 204. In this example, the administrator initially controls the document during the facilitation of the agreement. Once the need for facilitation ends, the third party 206 should transfer ownership to the second party 204. Referring to FIG. 3B, in step 314, the third party 206 requests a transfer of ownership to the second party 204. This request is authenticated and secured using the third party's private key. The request is then recorded in the shared registry 210. In step 316, the second party 204 confirms the transfer of ownership of the document by recording the acceptance in the shared registry 210. The transaction is then authenticated and secured by the second party's private key.

As a result of the above steps, the shared registry 210 comprises entries reflecting the original document's contents, a description, and the storage location of the document. The shared registry 210 also comprises entries reflecting the transfer of ownership from the third party 206 to the second party 204. Further transfers of ownership may be recorded in the shared registry 210 as was done in steps 314 and 316. In certain embodiments of the invention, the register entry 400-1 recorded in the shared registry 210 may comprise a hash value that is derived from a previous record. Thus, the hash value may be used in the future to validate the contents of this previous record. This validation process may be repeated for each registry entry back to the previous registry. Because the entries are stored in a shared registry 210, wherein the entries in the shared registry are validated by the participants in the shared registry and the entries cannot be changed after being entered into the shared registry, the shared registry can be used to trace the provenance of a document. A construct of a shared registry 210, assurances of the source, and the immutability of each registry entry 400-1, is generally referred to as a blockchain. In the current embodiment, the blockchain of registry entries 400-1, each of which includes a hash value, is used to trace the provenance of a document back to its original storage by the administrator.

Figure 5:
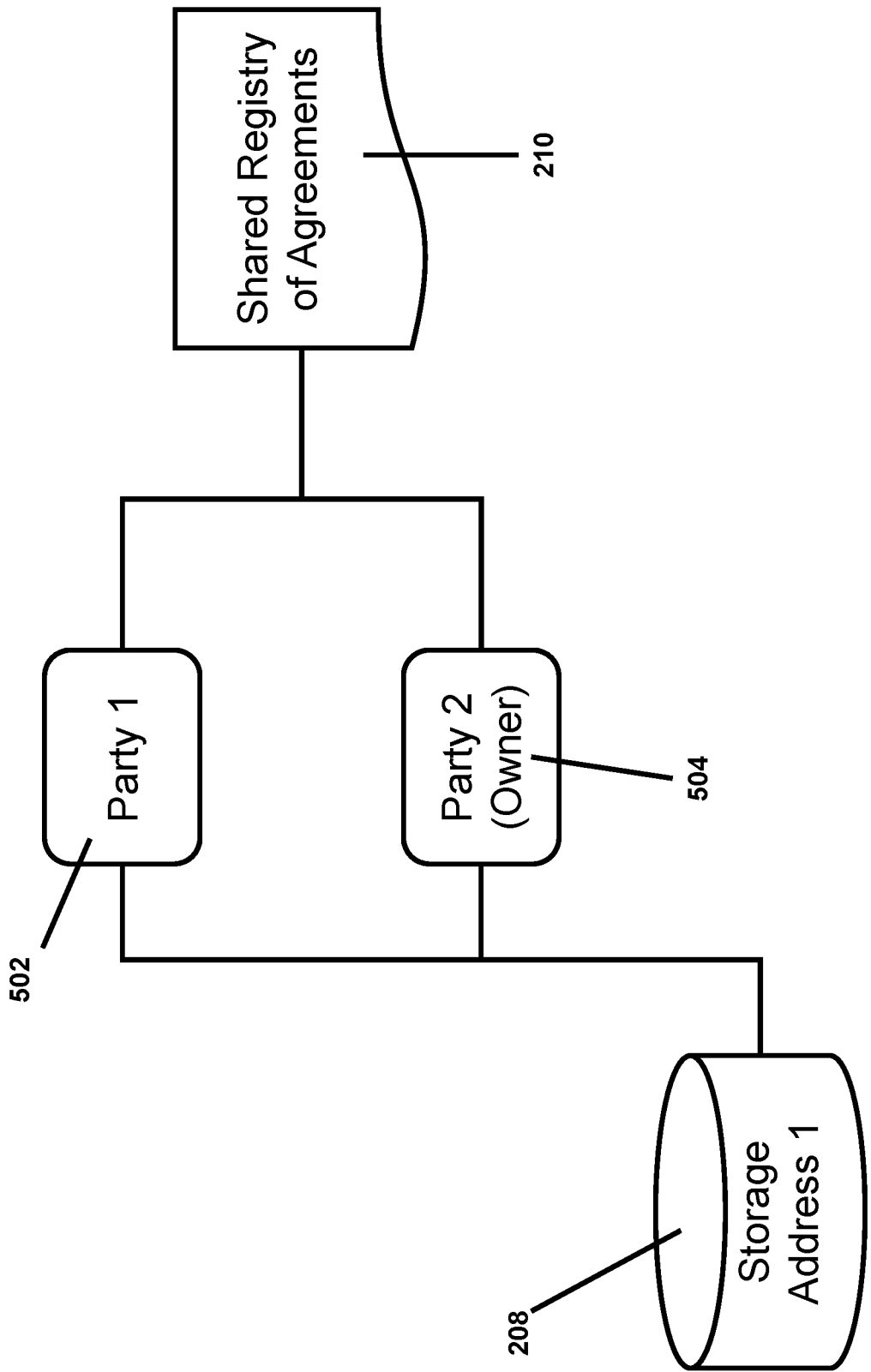
FIG. 5 is a diagram illustrating an owner of a document and a second party who may wish access to the document.
Figure 6:
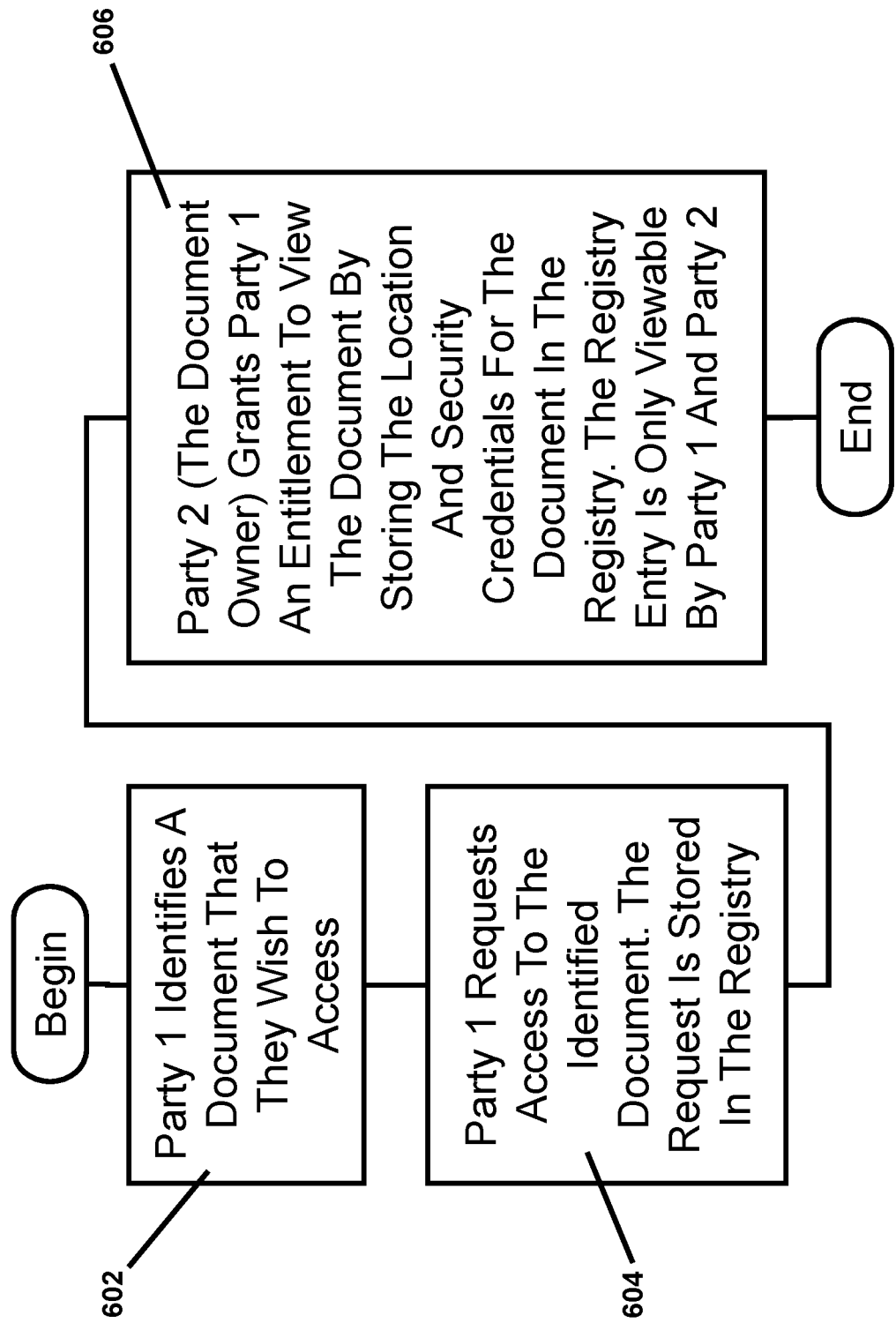
FIG. 6 is a flow chart illustrating the steps taken using an exemplary embodiment of the invention to grant a party access to view a stored document.

In certain circumstances, the owner of a document or other electronic asset may wish to permit another party to view or otherwise access the document or asset. As is illustrated in FIG. 5 and the flow chart of FIG. 6, a first party 502, may identify a document they wish to access in step 602. In step 604, the first party 502 requests access to the identified document. The request is stored in the shared registry 210. In addition to being stored, this request may be communicated to the document owner 504 directly or indirectly. If the owner 504 wishes to provide access, the location of the document and security credentials may be provided by the owner 504 and stored in an entry in the shared registry 210. The registry entry may only be viewable by the party 502 requesting access and the owner 504 of the document. Storing both the request for access and information granting access in the shared registry 210 further enhances the provenance record of the document.

Figure 7:
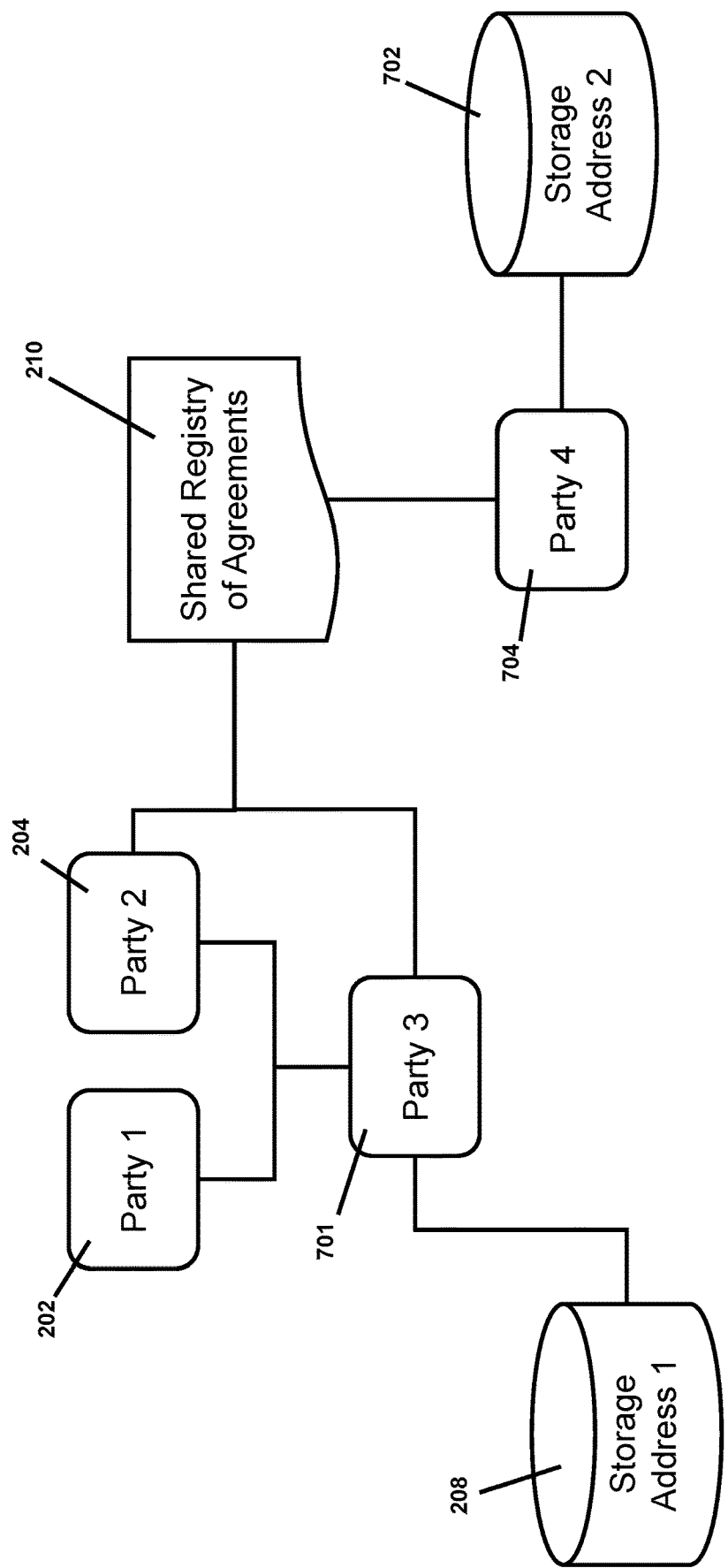
FIG. 7 is a diagram illustrating the parties, shared registry, and storage locations representing a transfer of the storage location of a document according to an exemplary embodiment of the invention.
Figure 8:
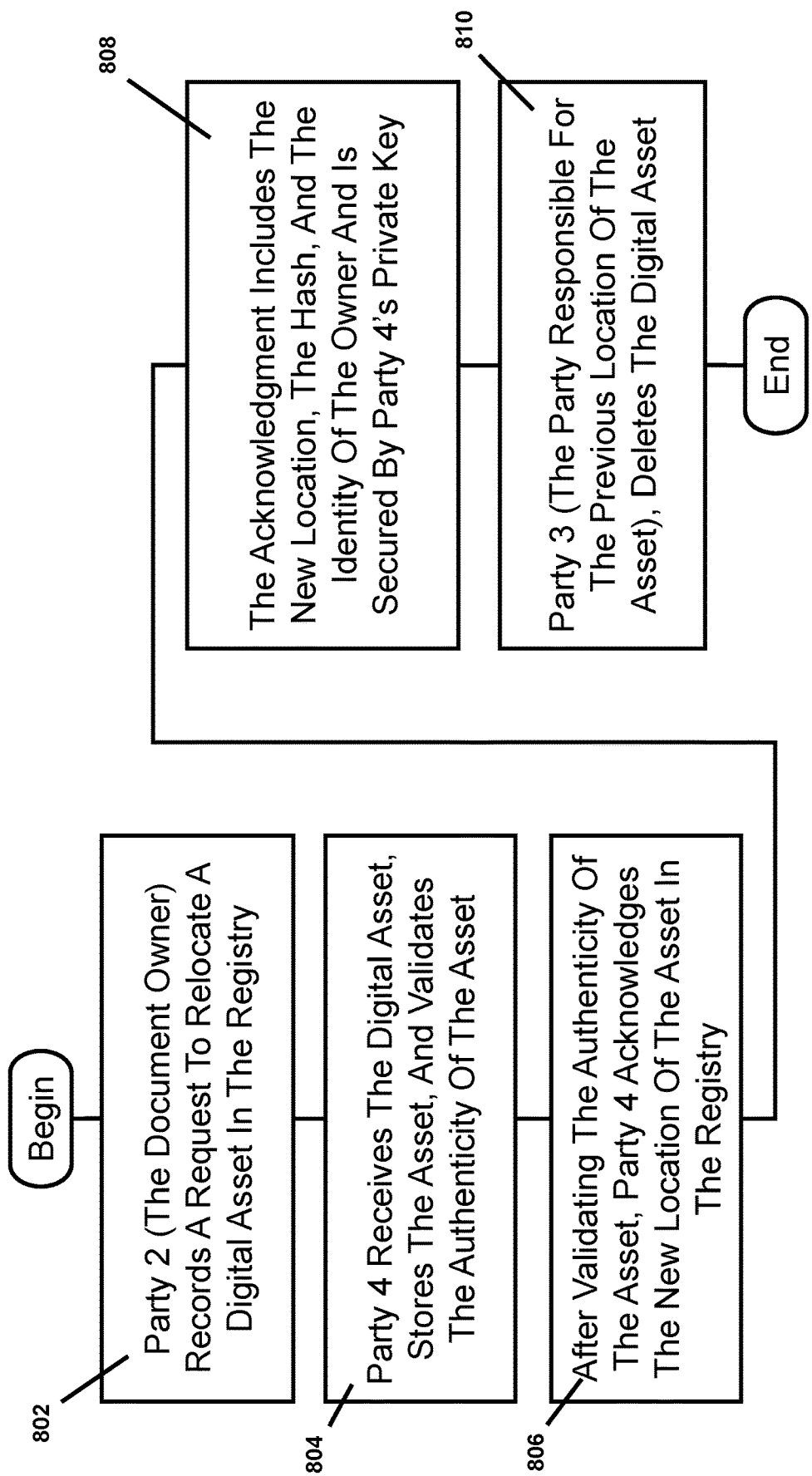
FIG. 8 is a flow chart illustrating the steps taken to change the storage location of a document according to an exemplary embodiment of the invention.

In addition to ownership concerns, there is also a need to track the storage location of the original document. For example, the owner of a document may wish to transfer the document from a first storage address to a second storage address. As is illustrated in FIG. 7, a first storage address 208 may be associated with the first administrator 701. A second storage address 702 may be associated with a second administrator 704. In some exemplary embodiments, the first administrator 701 and the second administrator 704 are the same party. In an exemplary embodiment of the invention, the second party 204 (owner) of a document or asset may wish to transfer the original document or asset from the first storage address 208 to the second storage address 702. As is described in the flow chart of FIG. 8, the second party 204 may record, in the shared registry 210, a request to relocate a digital asset in step 802. In step 804, the second administrator 704 of the second storage address 702 may receive, store, and validate the authenticity of the digital document or asset. Validating the authenticity of the document may involve examining the hash associated with the last entry in the shared registry and working backwards through records in the shared registry 210 to confirm the authenticity of the document to be stored.

Once the second administrator 704 has validated the authenticity of the document, the second administrator acknowledges the new location of the document by recording the location in an entry into the shared registry 210 in step 806. As is disclosed in step 808, the entry in the shared registry 210 may comprise an identification of the new storage location, a hash value calculated from the previous entry, and the identity of the owner of the document. This entry is then secured by the private key of the second administrator 704. In this exemplary embodiment, the first administrator 701 of the first storage address 208 then deletes the digital document from the first storage location. The result may be a record that details the ownership and location of the original electronic copy of the document.

In certain circumstances, it may be the case that the first administrator 701 does not delete the digital document from the first storage address 208 after the original document is relocated to the second storage address 702. This may result in there being two identical digital documents, each with a different storage address. After repeated relocations of the original document to new storage addresses, there may be a plurality of identical digital documents remaining at the old storage addresses. In order to provide certainty as to which of these identical documents is to be considered the original document, and also to identify the owner of that original document, an interested party may review the shared registry 210 entries in order to ascertain the then current location of the original digital document. This review may also identify the owner of that original document. This method provides a reliable and verifiable way to identify both the current storage address and the current owner of the document. As would be understood by one of ordinary skill in the art, the described invention represents a reliable and accurate method of managing the provenance of an electronic document or other digital asset.

Figure 9:
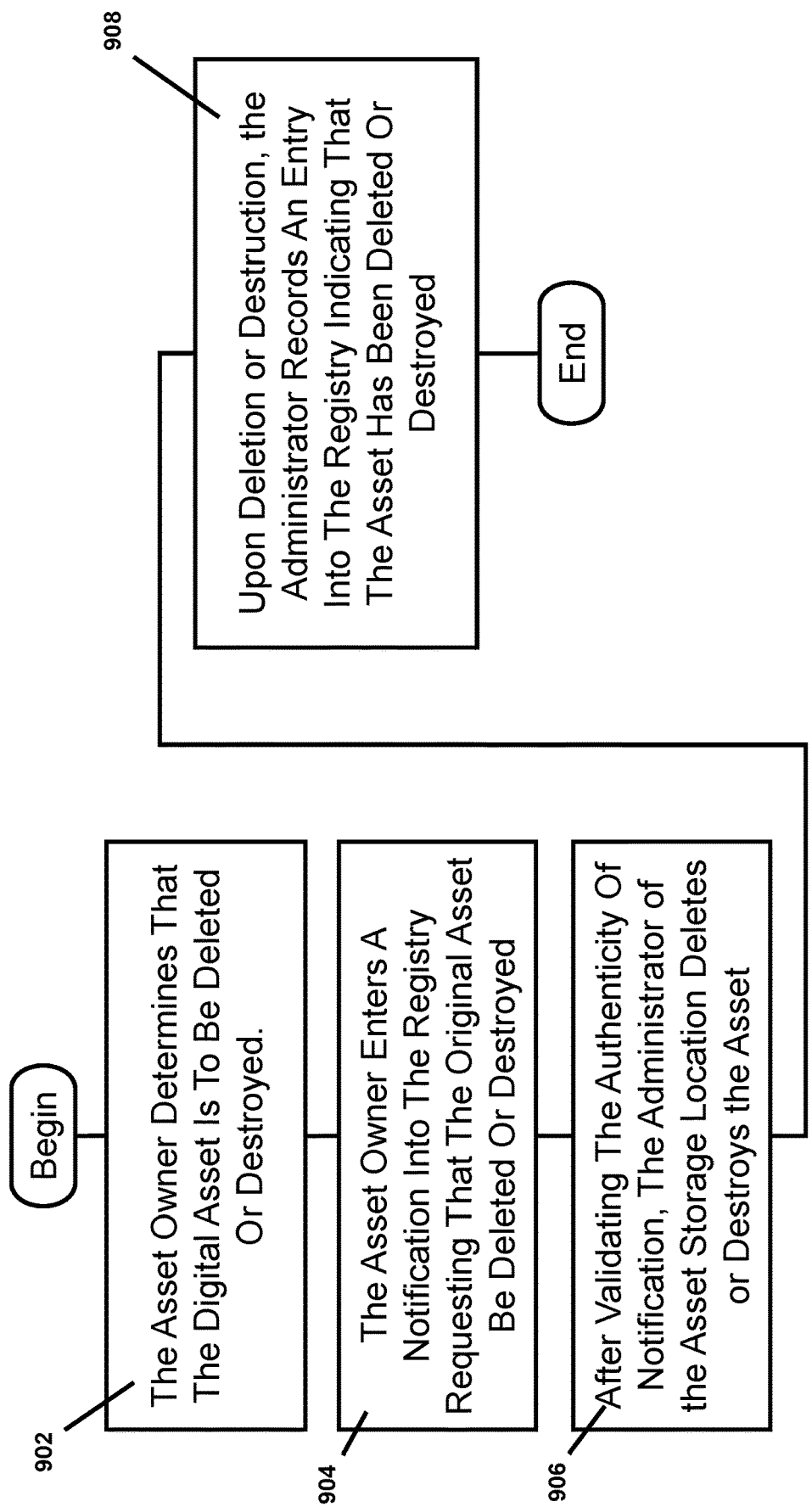
FIG. 9 is a flow chart illustrating the steps taken to delete the original copy of a stored document according to an exemplary embodiment of the invention.

As was noted in the previous discussion, there may be circumstances in which it is desired that copies of the asset are deleted or otherwise destroyed. In addition to deleting copies of the asset that don't represent the original asset, there may be conditions in which the original copy is to be deleted or destroyed. The process according to an exemplary embodiment of the invention is illustrated in FIG. 9. In step 902, the second party 204 of the asset determines that they wish to delete or destroy the asset and in step 904, enters a request to delete or destroy the asset into the shared registry 210. In step 906, the administrator of the asset storage location verifies the authenticity of the request and upon proper verification, deletes or destroys the stored copy of the asset. As is shown in step 908, once the asset is deleted or destroyed, the administrator places an entry into the shared registry 210 that confirms that the original document has been deleted or destroyed.

While the present invention has been illustrated by the description of embodiments thereof, and while the embodiments have been described in considerable detail, it is not the intention of the Applicant to restrict or in any way limit the scope of the appended claims to such detail. Additional advantages and modifications will readily appear to those skilled in the art. Moreover, elements described with one embodiment may be readily adapted for use with other embodiments. Therefore, the invention, in its broader aspects, is not limited to the specific details, the representative apparatus, and illustrative examples shown and described. Accordingly, departures may be made from such details without departing from the spirit or scope of the general inventive concepts.

What is claimed is:

1. A method of managing the provenance of digital assets, the method comprising:
   receiving a first digital asset;
   receiving the identity of a first owner of the digital asset;
   storing the digital asset in a first storage location;
   generating a first hash value using the digital asset and identity of the first owner;
   receiving a description of the digital asset;
   storing in a first registry location, the description, the first hash value, and a pointer to the first storage location;

generating a second hash value using the description, the first hash value, and the pointer;

receiving a request from the first owner to move the digital asset from the first location to a second storage location;

storing the request in a Nth registry location;

storing what is stored in a Nth−1 registry location and the Nth−1 hash value into the Nth registry location;

generating an Nth hash value using what is stored in the Nth registry location;

and creating a copy of the digital asset in the second storage location and removing the digital asset from the first storage location.

2. The method of claim 1, further comprising:
storing in the first registry location, a private key required to access the first storage location.

3. The method of claim 1, further comprising:
storing in a second registry location, the second hash value and a status of the digital asset;
and generating a third hash value using what is stored in the second registry location.

4. The method of claim 1, further comprising:
validating that the digital asset is an original asset prior to storing the digital asset in the first storage location.

5. The method of claim 1, wherein the digital asset is an electronic document.

6. The method of claim 1, further comprising:
storing the location of the second storage location and the Nth hash value in a Nth+1 registry location; and
generating a Nth+1 hash value using a description, a hash value, and a pointer stored in the Nth+1 registry location.

7. The method of claim 1, further comprising:
granting access to the stored digital asset by performing the steps of:
  disclosing the storage location of stored digital asset to a party requesting access;
  providing necessary security credentials to allow viewing of the stored digital asset to the party requesting access;
storing a request by the party requesting access into a latest storage location along with what is stored in a storage location immediately previous to the latest storage location; and
generating a next hash value using a description, a hash value, and a pointer stored in the latest storage location.

8. The method of claim 1, where the registry comprises 1000 locations.

9. A method of managing the provenance of a stored document comprising:
receiving a physical document;
transforming the physical document into a digital document;
receiving the identity of an owner of the physical document;
storing the digital document in a first storage location;
generating a first hash value using the digital document and identity of the owner of the physical document;
receiving a description of the digital document;
storing in a first registry location, the description, the first hash value, and the location of a storage location;

generating a second hash value using, the description, the first hash value, and the location of the first storage location;

storing in a second storage location, the second hash value and a status of the digital document;

and generating a third hash value using what is stored in the second storage location.

10. The method of claim 9, further comprising:
storing in the first registry location, a private key required to access the first storage location.

11. The method of claim 9, further comprising:
validating that the physical document is an original document prior to storing the digital document in the first storage location.

12. The method of claim 9, wherein the physical document represents an agreement between two or more parties and the method further comprises:
facilitating a process of execution of the physical document between at least two parties.

13. The method of claim 9, further comprising:
destroying the physical document after transforming the physical document into a digital document.

14. A method of transferring ownership of digital assets comprising:
receiving the digital asset;
receiving the identity of a first owner of the digital asset;
storing the digital asset in a first storage location;
generating a first hash value using the digital asset and identity of the first owner of the asset as inputs;
receiving a description of the digital asset;
storing in a first registry location, the description, the first hash value, and the location of the first storage location;
generating a second hash value using the description, the first hash value, and the location of the first storage location stored in the first registry location;
receiving a request to transfer ownership from the first owner to a second owner;
authenticating the request;
storing the request along with the Nth hash value in the Nth registry location;
generating a Nth+1 hash value from the contents of the Nth registry entry which comprises the request and the Nth hash value;
receiving a confirmation of acceptance of ownership of the digital asset from the second owner;
storing the confirmation and the Nth+1 hash value in the Nth+1 registry location; and
generating a Nth+2 hash value from the confirmation and the Nth+1 hash value.

15. The method of claim 14, further comprising:
storing in the first registry location, a private key required to access the first storage location.

16. The method of claim 14, further comprising:
storing the identity of the second owner in a registry entry along with a hash value generated from a previous registry entry.

17. The method of claim 14, further comprising:
validating that the digital asset is an original asset prior to storing the digital asset in the first storage location.

18. The method of claim 14, wherein the digital asset is an electronic document.

* * * * *